Nov. 3, 1970  E. O. SCHWEITZER, JR  3,538,386
SYSTEM EMPLOYING MAGNETIC SWITCH MEANS RESPONSIVE
TO ALTERNATING CURRENT FLOW IN A CONDUCTOR
Filed June 7, 1968  2 Sheets-Sheet 1
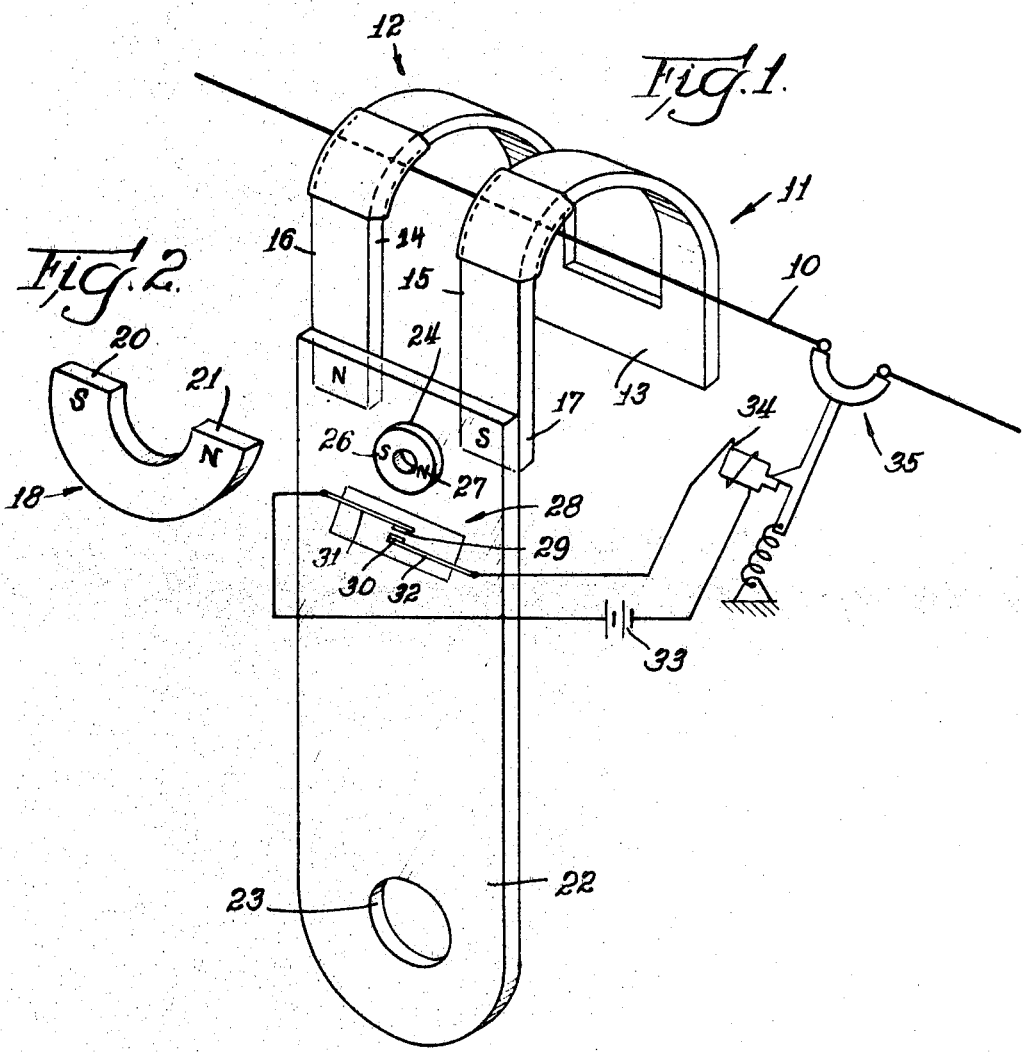
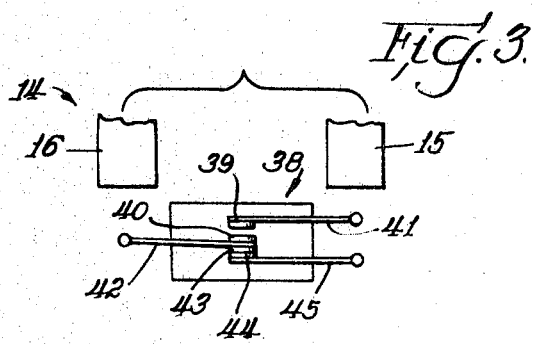

Nov. 3, 1970   E. O. SCHWEITZER, JR   3,538,386
SYSTEM EMPLOYING MAGNETIC SWITCH MEANS RESPONSIVE
TO ALTERNATING CURRENT FLOW IN A CONDUCTOR
Filed June 7, 1968   2 Sheets-Sheet 2
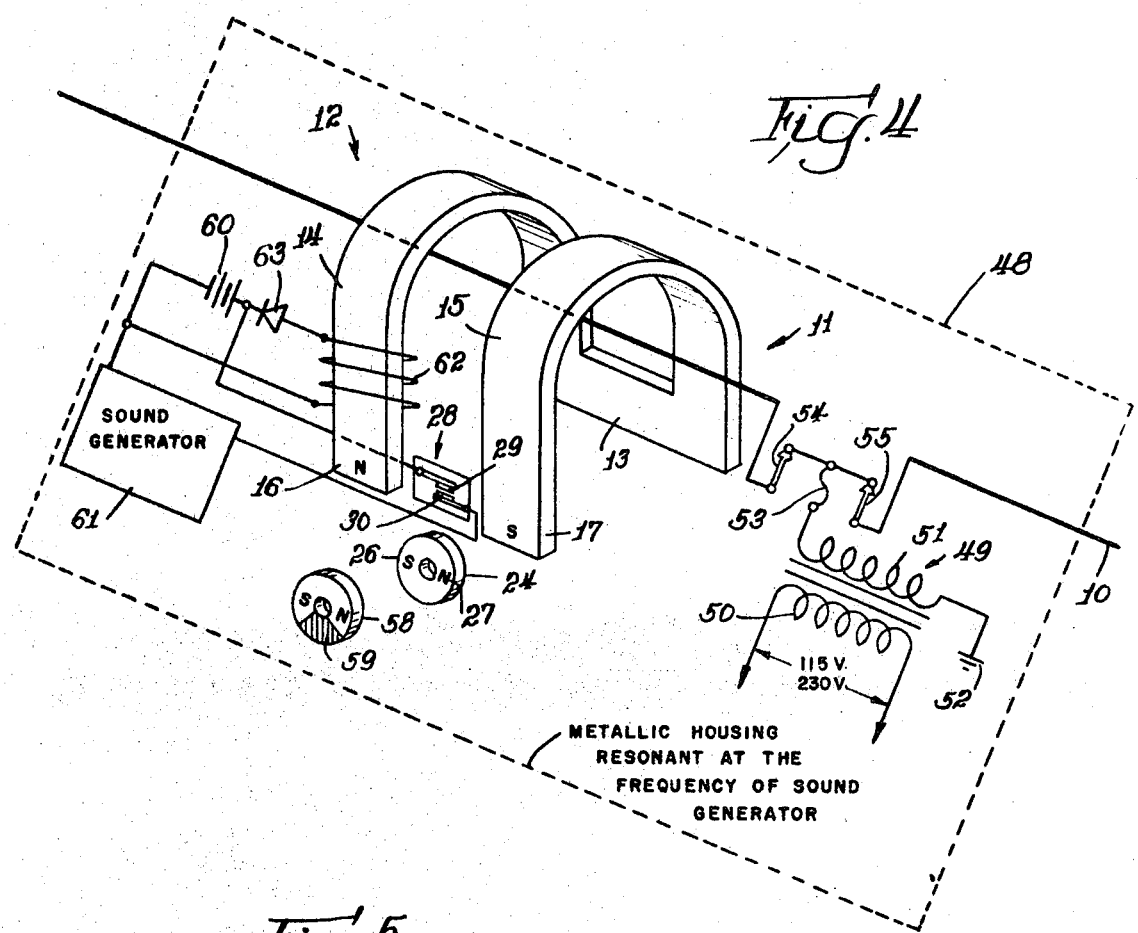
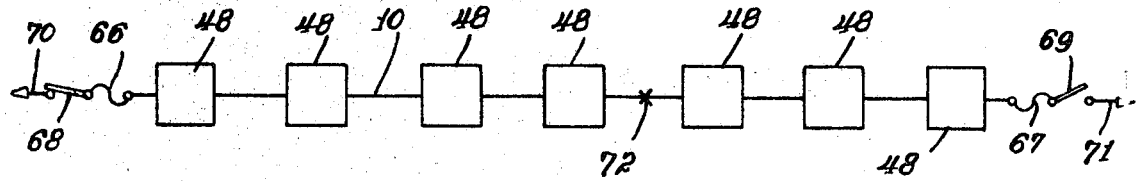
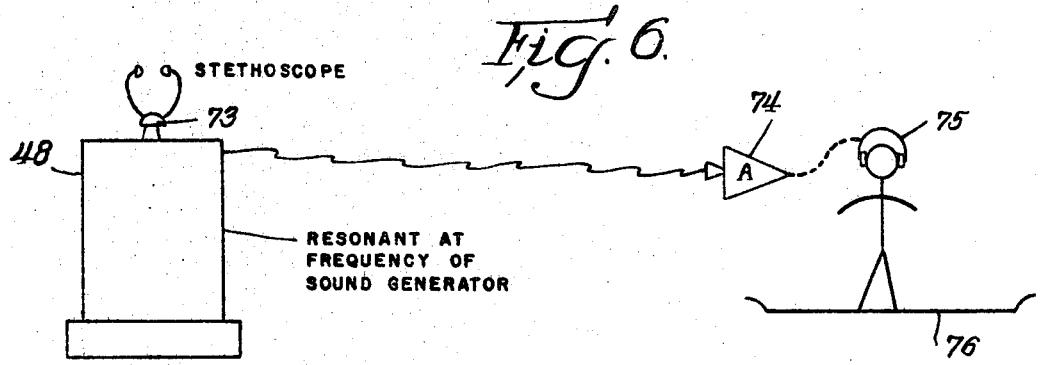

3,538,386
SYSTEM EMPLOYING MAGNETIC SWITCH MEANS RESPONSIVE TO ALTERNATING CURRENT FLOW IN A CONDUCTOR
Edmund O. Schweitzer, Jr., 1002 Dundee Road, Northbrook, Ill. 60062
Filed June 7, 1968, Ser. No. 735,423
Int. Cl. H02h 1/00; H01h 9/00
U.S. Cl. 317—58                          17 Claims

ABSTRACT OF THE DISCLOSURE

A reed type magnetic switch is responsive to reduction in a unidirectional magnetic field caused by predetermined alternating current flow in a conductor to operate a relay or frequency generator enclosed in a metallic housing, also enclosing a transformer, and having a resonant frequency the same as that of the generator for signalling externally of the housing that such flow of alternating current in the conductor has occurred.

---

As disclosed in Nelson et al. U.S. Pat. 3,014,158, issued Dec. 19, 1961, transformers for distribution of electric power are enclosed in metallic housings with their primary windings connected for energization between ground and a common high voltage alternating current carrying conductor. The conductor is arranged to be connected at each end to a current source through a circuit interrupter, such as a fuse. Usually the conductor is energized only from one end. The metallic housings containing the transformers are located at some distance from each other and the conductor for energizing their primary windings is usually placed underground. When a fault develops in the conductor, the circuit interrupter operates to disconnect it from the current source. This deenergizes all the transformers. The fault must be located and removed before the transformers can be permanently reenergized.

It has been proposed that a fault indicator, such as disclosed in Sankey U.S. Pat. 3,177,480, issued Apr. 6, 1965, be used to locate the fault. The fault indicator is placed on the conductor in the housing and it is operated on flow of fault current. The fault indicator is located in the high voltage compartment to which access usually can be had only after opening the low voltage compartment of the metallic housing. This inspection must be repeated for each transformer installation until an unoperated indicator is found. This shows that the fault is between this transformer and the last one where the indicator had been operated. Another fault indicator that can be used is disclosed in my application Ser. No. 491,000, filed Sept. 28, 1965.

When a fault occurs which causes a section of the distribution system to be deenergized, the power company is notified and a lineman is dispatched to locate the difficulty and to restore power to the extent possible. Usually the transformers are of the pad mounted type in metallic housings located along the lot lines and hidden by shrubbery. The lineman in automobile or service truck drives along a street paralleling the lot line and is required to leave it periodically to locate the pad mounted transformer installations and then to open the housings, one by one, to check the fault indicator therein. This requires an appreciable amount of time during which all of the dwellings served by the several pad mounted transformers are without electric power.

Among the objects of this invention are: to provide for locating fault indicators in pad mounted transformers housings that have operated without requiring that the housing be opened for inspection; to arrange for such inspection by the lineman without requiring that he leave his position along the street or in an automobile or service truck; to generate an audible frequency within the metallic housing for a pad mounted transformer and to detect the frequency externally of the housing either in the immediate vicinity or at a remote location; to employ a frequency that is substantially the same as the resonant frequency of the metallic housing; to utilize a fault indicator in the form of a U-shaped relatively low coercive force magnetic member having its arms individually of U-shape with the distal ends adapted to be magnetized with poles of opposite polarity and arranged to be demagnetized on flow of fault current in the conductor to operate a magnetic reed type switch from one position to another position to energize a device such as a frequency generator, relay or the like; to provide a high coercive force magnet in conjunction with the low coercive force magnetic member to operate the switch when the latter is demagnetized on flow of fault current in the conductor; to provide a source of energy for the frequency generator within the metallic housing in the form of a rechargeable battery that is maintained in charged condition by current flow through the high voltage conductor; to link a winding with one of the arms of the U-shaped magnetic member and to connect the winding through a rectifier to the battery; and to provide a visual indication of the operation of the fault indicator in addition to the operation of the magnetic reed type switch.

In the drawings: FIG. 1 is a perspective view, somewhat diagrammatic in character, showing the application of a fault indicator in which the present invention is embodied for controlling the operation of a circuit breaker. FIG. 2 is a perspective view of the charging or reset magnet used in conjunction with the system shown in FIG. 1. FIG. 3 shows a modification of the fault indicator shown in FIG. 1. FIG. 4 is a perspective view, somewhat diagrammatic in character, showing the application of the fault indicator of the present invention to a pad mounted transformer located in a metallic housing. FIG. 5 shows diagrammatically the arrangement of a number of pad mounted transformer installations and their connections for energization to either of two current sources. FIG. 6 shows diagrammatically how the operation of a fault indicator of the present invention can be detected externally of the metallic housing.

In FIG. 1 a high voltage conductor is indicated at 10. The conductor 10 represents one phase of a three phase alternating current power distribution system and may be energized at a voltage of 14.5 kv. with respect to ground. It will be understood that it can be energized at other voltages. Associated with the conductor 10 is a fault indicator that is indicated, generally, at 11 and includes a U-shaped magnetic member or yoke of relatively low coercive force magnetic material that is indicated, generally, at 12. The magnetic member or yoke 12 includes a connecting section 13 and arms 14 and 15 which embrace the conductor 10 so that the alternating magnetic field generated by alternating current flow in the conductor 10 is capable of affecting the magnetic characteristics of the magnetic member or yoke 12. The distal ends 16 and 17 of the arms 14 and 15 are arranged to have induced therein magnetic poles as indicated by a U-shaped charging magnet or reset magnet that is indicated, generally, at 18 in FIG. 2. The charging magnet 18 has pole tips 20 and 21. By passing the charging magnet 18 along the inner sides of the arms 14 and 15 beginning with the connecting section 13 and ending at the distal ends 16 and 17, magnetic poles of the polarity indicated are induced at the distal ends 16 and 17. A magnetic field is created between the distal ends 16 and 17.

A non-magnetic support plate or handle 22 is suitably secured to the distal ends 16 and 17 of the arms 14 and 15. The support plate or handle 22 has an eye 23 for receiving a hook of a live line tool that is employed for applying the fault indicator 11 to the conductor 10 or removing it therefrom.

Mounted on the support plate or handle 22 adjacent the distal ends 16 and 17 of the arms 14 and 15 is an annular high coercive force magnet 24 that is provided with permanent magnet poles 26 and 27 that are diametrically located and are adjacent opposite poles at the distal ends 16 and 17. The magnet 24 is stationarily mounted on the support plate or handle 22.

Also mounted on the support plate or handle 22 and adjacent the magnet 24 is a reed type magnetic switch that is indicated, generally, at 28. The reed type magnetic switch 28 is of conventional construction and includes magnetic contacts 29 and 30 in overlapping relation at the ends of reeds 31 and 32 of spring wire which bias the magnetic contacts 29 and 30 to the open position.

As long as the distal ends 16 and 17 of the arms 14 and 15 are magnetized by the charging magnet 18, the magnetic field therefrom is substantially equal to the magnetic field from the poles 26 and 27 of the magnet 24. As a result the contacts 29 and 30 of the reed type magnetic switch 28 remain in the open position. Now when sufficient current flows through the conductor 10 to demagnetize the magnetic member or yoke 12 and thereby reduce the magnetic field between the distal ends 16 and 17, the magnetic field of the magnet 24 then is capable of causing the magnetic contacts 29 and 30 to attract each other and to complete a circuit therethrough.

In the system shown in FIG. 1 advantage is taken of the closure of contacts 29 and 30 of the reed type magnetic switch 28 to complete a circuit from a battery 33 for energizing a trip winding 34 of a circuit breaker that is indicated, generally, at 35. Thus, when a predetermined current flows in the conductor 10, the reed type magnetic switch 28 is operated to trip the circuit breaker 25 and open the circuit through the conductor 10. Thereafter, the circuit breaker 35 is reclosed and the magnetic member or yoke 12 is recharged by passing the charging magnet 18 along the inner sides of the arms 14 and 15 to open the contacts 29 and 30 of the reed type magnetic switch 28. It will be understood that the reed type magnetic switch 28 is opened before the circuit breaker 35 is reclosed.

FIG. 3 shows a modification of the system illustrated in FIG. 1. In FIG. 3 the arrangement is such that it is unnecessary to employ the high coercive force magnet 24. Instead, there is provided a reed type switch, indicated generally at 38, which includes normally open contacts 39 and 40 of magnetic material which are carried by reeds 41 and 42. In addition contacts of non-magnetic material 43 and 44 are employed, contact 43 being carried by the reed 42 and contact 44 being carried by the reed 45. The arrangement of the contacts is such that a single pole double throw switch is provided. When the distal ends 16 and 17 of the arms 14 and 15 are magnetized by the charging magnet 18 in the manner described, the magnetic contacts 39 and 40 are attracted and thus they are closed. At the same time non-magnetic contacts 43 and 44 are opened. On demagnetization of the arms 14 and 15 of the magnetic member or yoke 12 by alternating current flow, such as that through the conductor 10, the magnetic contacts 39 and 40 no longer are attracted. They open and non-magnetic contacts 43 and 44 are closed. Use can be made of the single pole double throw operation of the reed type switch 38 as may be desired.

In FIG. 4 the fault indicator 11 is illustrated as embracing the high voltage conductor 10 which extends in insulated relation through a metallic housing 48, that is shown in broken line outline, which encloses a pad mounted transformer that is indicated, generally, at 49. The transformer 49 includes a low voltage secondary winding 50 that is arranged to be connected to a suitable load such as that provided by a residence. The transformer 48 also includes a primary high voltage winding 51 which is connected between ground 52 and the conductor 10 through a fuse 53 and plug type connectors 54 and 55. It will be understood that the plug type connectors 54 and 55 are employed for connecting the conductor 10 through the metallic housing 48 and that one or the other of the plug type connectors 54 or 55 can be opened to permit energization of the primary high voltage winding 51 from only one part of the conductor 10. The fuse 53 is employed for protecting the system against the fault in the transformer 49 or a fault connected to the secondary winding 50.

Where it is desired to provide a definite indication that fault current has flowed through the conductor 10, a rotatable high coercive force magnet 58 is employed. It is mounted for rotation about an axis that extends through the axis of the stationary magnet 24. The rotatable magnet 58 carries a target 59 which normally is not visible. However, when the current flow through the conductor 10 exceeds a predetermined value, the magnetic member or yoke 12 is demagnetized sufficiently to cause the magnet 58 to rotate through 180° in which position the target 59 is visible.

In the system shown in FIG. 4 the reed type magnetic switch 28, on closure, is arranged to complete a circuit from a battery 60 for energizing a frequency generator 61. The generator 61 may be arranged to generate an audible frequency, for example a frequency of 2400 Hz. Also it may be arranged to generate other frequencies including those in the supersonic range. For maintaining the battery 60, which is a rechargeable battery, in charged condition a winding 62 is located on the arm 14 of the magnetic member or yoke 12 and is connected through a rectifier 63 to the battery 60.

Preferably the frequency at which the generator 61 operates is the same as the resonant frequency of the metallic housing 48. It acts as a mechanical resonator and makes it possible to detect readily externally of the metallic housing 14 the presence of the frequency which indicates that the fault indicator 11 has responded to flow of fault current. Thus, it is unnecessary to enter the metallic housing 48 to determine that the fault indicator 11 has operated. However, it will be recalled that the rotatable magnet 58 provides a definite indication that the fault indicator 11 has operated. In the event that the lineman is not able to detect externally the presence of the frequency generated by the generator 61 due to the running down of the battery 60, there still is an indication that the fault indicator 11 has operated and that the fault is located somewhere beyond the particular installation involved.

FIG. 5 shows a typical installation of a number of the systems shown in FIG. 4. It will be understood that each of the metallic housings 48 is individual to a number of dwellings and that they are located along the back lot line, usually are painted with a color that blends with the shrubbery and are usually hidden by shrubbery. Since the metallic housings 48 can be expected to have children playing adjacent them and possibly sitting on them, it is imperative that there be no possible means of ingress into the housings 48 except for authorized personnel. Also, it is not feasible to have any indicating devices which would project through the housing or windows to permit observation of the interior. Because of these limitations it is highly desirable that the means provided herein be employed for detecting externally of each of the housings 48 whether or not the fault indicator 11 therein has operated.

The conductor 10, usually buried underground, interconnects the pad mounted transformers 49 in the several metallic housings 48 and at its ends it is connected by fuses 66 and 67 and switches 68 and 69 to high voltage supply conductors 70 and 71. Ordinarily only one of the switches, for example the switch 68, is closed to energize the conductor 10 from the high voltage supply conductor 70. The other switch 69 is open.

Upon the occurrence of a fault on the conductor 10, such as that indicated at 72, which may consist of the conductor 10 being inadvertently grounded, the circuit interrupter in the form of the fuse 66 operates to disconnect the conductor 10 and all of the transformers 49 supplied thereby. As a result, a number of residences are not supplied with electric power.

As a result of the formation of the fault 72 the fault indicators 11 in the metallic housings 48 between the fault 72 and the blown fuse 66 are operated while those fault indicators 11 in the metallic housings 48 between the fault 72 and the unblown fuse 67 are not operated. In order to locate the fault 72 it is necessary to determine which of the fault indicators 11 have operated and those which have not operated.

FIG. 6 shows two arrangements for detecting externally of the metallic housings 48 whether the fault indicator 11 therein has operated. Using one method, a stethoscope 73 is applied to the metallic housing 48 to determine whether the generator 61 is generating its frequency. As soon as the lineman determines that the generator 61 is operating, he knows that the fault 72 is beyond the particular installation. Assuming that the lineman is proceeding from the blown fuse 66, he continues to apply the stethoscope 73 to the metallic housings 48 in succession until he comes to the first one beyond the fault 72 where he detects no sound. He then knows that the fault is between that particular metallic housing 48 and the immediately preceding one. The lineman then can open the metallic housings 48 adjacent the fault 72. For the pad mounted transformer 49 to the left of the fault 72, the plug type connector 55 is opened. The fuse 66 then can be replaced and power then is restored to those pad mounted transformers between the fuse 66 and the fault 72. Also, for the pad mounted transformers 49 to the right of the fault 72, the plug type connector 54 is opened. Thereafter, the switch 69 is closed and power is restored to those pad mounted transformers 49 between the fault 72 and the fuse 67.

Under proper operating conditions the combination of the frequency generator 61 and the metallic housing 48 is such as to provide a detectable audible sound at a substantial distance from the individual housing 48. As indicated in FIG. 6 the sound is amplified by an amplifier 74 and is applied to a head set 75 of a lineman who may be located in an automobile or a service truck along a street 76. Alternatively, a loud speaker in the automobile or truck could be used. As the lineman cruises along the street 76, beginning, for example, at the blown fuse 66, he can readily detect sound emanating from the individual metallic housings 48 without having to leave the street 76 in order to individually locate them. As soon as he is unable to detect a sound for a substantial distance, he is aware that he has passed the last metallic housing 48 containing a fault indicator 11 that has operated. Then he can proceed as above outlined for restoring service.

What is claimed as new is:

1. Means responsive to flow of alternating current in a conductor comprising:
   a generally U-shaped magnetic member having its arms individually of U-shape for embracing said conductor, having relatively low coercivity, and having poles of opposite polarity at the distal ends of said arms, and
   magnetically operable switch means within the magnetic field of said poles having contacts in one position when the magnetic field from said poles is present and in another position when said magnetic field is reduced on flow of alternating current in said conductor.

2. Alternating current responsive means according to claim 1 wherein said switch means includes contacts of magnetic material closed by said magnetic field and opened by spring biasing action.

3. Alternating current responsive means according to claim 1 wherein said switch means includes contacts of magnetic material closed by said magnetic field and contacts of nonmagnetic material opened by spring biasing action on reduction of said magnetic field.

4. Alternating current responsive means according to claim 1 wherein:
   a high coercive force magnet is stationarily positioned in said magnetic field having its poles adjacent opposite poles at said distal ends of said arms, and
   said contacts of said switch means are biased to one position when said magnetic field is neutralized by said magnet and occupy another position when said magnetic field is reduced on demagnetization of said arms by flow of alternating current in said conductor.

5. Means responsive to flow of alternating current in a conductor comprising:
   a generally U-shaped magnetic member having its arms individually of U-shape for embracing said conductor, having relatively low coercivity, and having poles of opposite polarity at the distal ends of said arms,
   magnetically operable switch means within the magnetic field of said poles having contacts in one position when the magnetic field from said poles is present and in another position when said magnetic field is reduced on flow of alternating current in said conductor,
   a high coercive force magnet stationarily positioned in said magnetic field having its poles adjacent opposite poles at said distal ends of said arms,
   said contacts of said switch means being biased to one position when said magnetic field is neutralized by said magnet and occupy another position when said magnetic field is reduced on demagnetization of said arms by flow of alternating current in said conductor, and
   a rotatable high coercive force magnet mounted coaxially of said stationary magnet having like poles adjacent like poles of said stationary magnet as long as said magnetic field is present from said poles at said distal ends of said arms of said U-shaped magnetic member sufficient to maintain such relationship.

6. Alternating current responsive means according to claim 1 wherein:
   a metallic housing encloses said magnetic member and said switch means,
   a frequency generator is in said housing, and
   circuit means connect said generator to a current source when said switch means is in said other position.

7. Means responsive to flow of alternating current in a conductor comprising:
   a generally U-shaped magnetic member having its arms individually of U-shape for embracing said conductor, having relatively low coercivity, and having poles of opposite polarity at the distal ends of said arms,
   magnetically operable switch means within the magnetic field of said poles having contacts in one position when the magnetic field from said poles is present and in another position when said magnetic field is reduced on flow of alternating current in said conductor,
   a metallic housing enclosing said magnetic member and said switch means,
   a frequency generator in said housing, and
   circuit means connecting said generator to a current source when said switch means is in said other position,
   said metallic housing having a resonant frequency substantially the same as the frequency of said generator.

8. Alternating current responsive means according to claim 7 wherein means are provided for detaching said frequency externally of said housing.

9. Alternating current responsive means according to claim 8 wherein said frequency detecting means includes a stethoscope.

10. Alternating current responsive means according to claim 8 wherein said frequency detecting means includes:
a sound amplifier, and
frequency responsive means connected to said amplifier.

11. Alternating current responsive means according to claim 1 wherein a load device is connected to a source of energy through said contacts on closure thereof.

12. Means responsive to flow of alternating current in a conductor comprising:
a generally U-shaped magnetic member having its arms individually of U-shape for embracing said conductor, having relatively low coercivity, and having poles of opposite polarity at the distal end of said arms,
magnetically operable switch means within the magnetic field of said poles having contacts in one position when the magnetic field from said poles is present and in another position when said magnetic field is reduced on flow of alternating current in said conductor,
a load device connected to a source of energy through said contacts on closure thereof,
said source of energy being a rechargeable battery,
a winding linking one of said arms of said magnetic member, and
circuit means including a rectifier interconnecting said battery and said winding.

13. Means responsive to flow of alternating current in a conductor comprising:
a metallic housing,
a transformer in said housing having a primary winding adapted to be energized from said conductor,
a frequency generator in said housing,
means for energizing said frequency generator on flow of predetermined current in said conductor,
a rechargeable battery within said housing for energizing said frequency generator, and
circuit means including a rectifier interconnecting said battery and said conductor.

14. Means responsive to flow of alternating current in a conductor comprising:
a metallic housing,
a transformer in said housing having a primary winding adapted to be energized from said conductor,
a frequency generator in said housing, and
means for energizing said frequency generator on flow of predetermined current in said conductor,
said metallic housing having a resonant frequency substantially the same of the frequency of said generator.

15. Alternating current responsive means according to claim 14 wherein means are provided for detecting said frequency externally of said housing.

16. Alternating current responsive means according to claim 15 wherein said frequency detecting means includes a stethoscope.

17. Alternating current responsive means according to claim 15 wherein said frequency detecting means includes
a sound amplifier, and
frequency responsive means connected to said amplifier.

References Cited

UNITED STATES PATENTS

| | | | |
|---|---|---|---|
| 3,134,870 | 5/1964 | Reed | 335—207 |
| 3,188,427 | 6/1965 | Cooper | 335—204 |
| 3,223,889 | 12/1965 | Schweitzer | 317—27 |
| 3,426,275 | 2/1969 | Schweitzer | 324—129 X |

J. D. MILLER, Primary Examiner

HARVEY FENDELMAN, Assistant Examiner

U.S. Cl. X.R.

317—60; 335—204, 207; 324—129